United States Patent
Usami

(10) Patent No.: US 10,038,390 B1
(45) Date of Patent: Jul. 31, 2018

(54) POWER CONVERSION CIRCUIT

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Yutaka Usami, Izunokuni Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/460,514

(22) Filed: Mar. 16, 2017

(51) Int. Cl.
*H02M 5/458* (2006.01)
*G03G 15/00* (2006.01)

(52) U.S. Cl.
CPC ............ *H02M 5/458* (2013.01); *G03G 15/80* (2013.01)

(58) Field of Classification Search
CPC .................................. H02M 5/458; G03G 15/80
See application file for complete search history.

(56) References Cited

U.S. PATENT DOCUMENTS

2014/0354073 A1* 12/2014 Sadakata ................. H02J 17/00
307/104

FOREIGN PATENT DOCUMENTS

JP 2007-80752 3/2007

* cited by examiner

*Primary Examiner* — David M Gray
*Assistant Examiner* — Michael Harrison
(74) *Attorney, Agent, or Firm* — Amin, Turocy & Watson LLP

(57) ABSTRACT

A power conversion circuit comprises a rectifying circuit, a first switching element, a second switching element, a third switching element, a fourth switching element, a series connection of a capacitor and an induction coil, a fifth switching element, a voltage detection section and a control circuit. The rectifying circuit rectifies an AC power supply. One side of the series connection of the capacitor and the induction coil is connected to a first connection point between the first switching element and the second switching element. The fifth switching element switches a state between a first connection state and a second connection state. The control circuit switches the fifth switching element between the first connection state and the second connection state based on the detection voltage by the voltage detection section and inputs a pulse signal to the first to the fourth switching elements.

20 Claims, 8 Drawing Sheets

POWER CONVERSION CIRCUIT

FIELD

Embodiments described herein relate generally to a power conversion circuit and devices and methods related thereto.

BACKGROUND

An image forming apparatus executes printing in response to a print request. The image forming apparatus forms an image on a conveyed paper sheet and discharges the paper sheet on which the image is formed. For example, the image forming apparatus forms an image on the paper sheet by forming a toner image on the paper and fixing the toner image with a fixing roller having a high temperature.

A power conversion circuit used in the image forming apparatus generates a pulsated positive voltage by full-wave rectifying a commercial power input which is an AC power supply with a diode bridge. Further, the power conversion circuit generates high frequency current from the pulsated positive voltage with a half bridge inverter and a full bridge inverter connected to the diode bridge. In the power conversion circuit, the high frequency current flows to a coil to generate an induced current (eddy current) in a load by the magnetic field generated in the coil. As a result, heat is generated in the load. The fixing roller is heated to a high temperature by the heat generated in the load.

In Japanese Unexamined Patent Application Publication No. 2007-080752, an induction heating cooking device for detecting a state of the load to select constitution of an inverter circuit suitable to heating and set an inverter drive condition is described.

DETAILED DESCRIPTION

Figure 1:
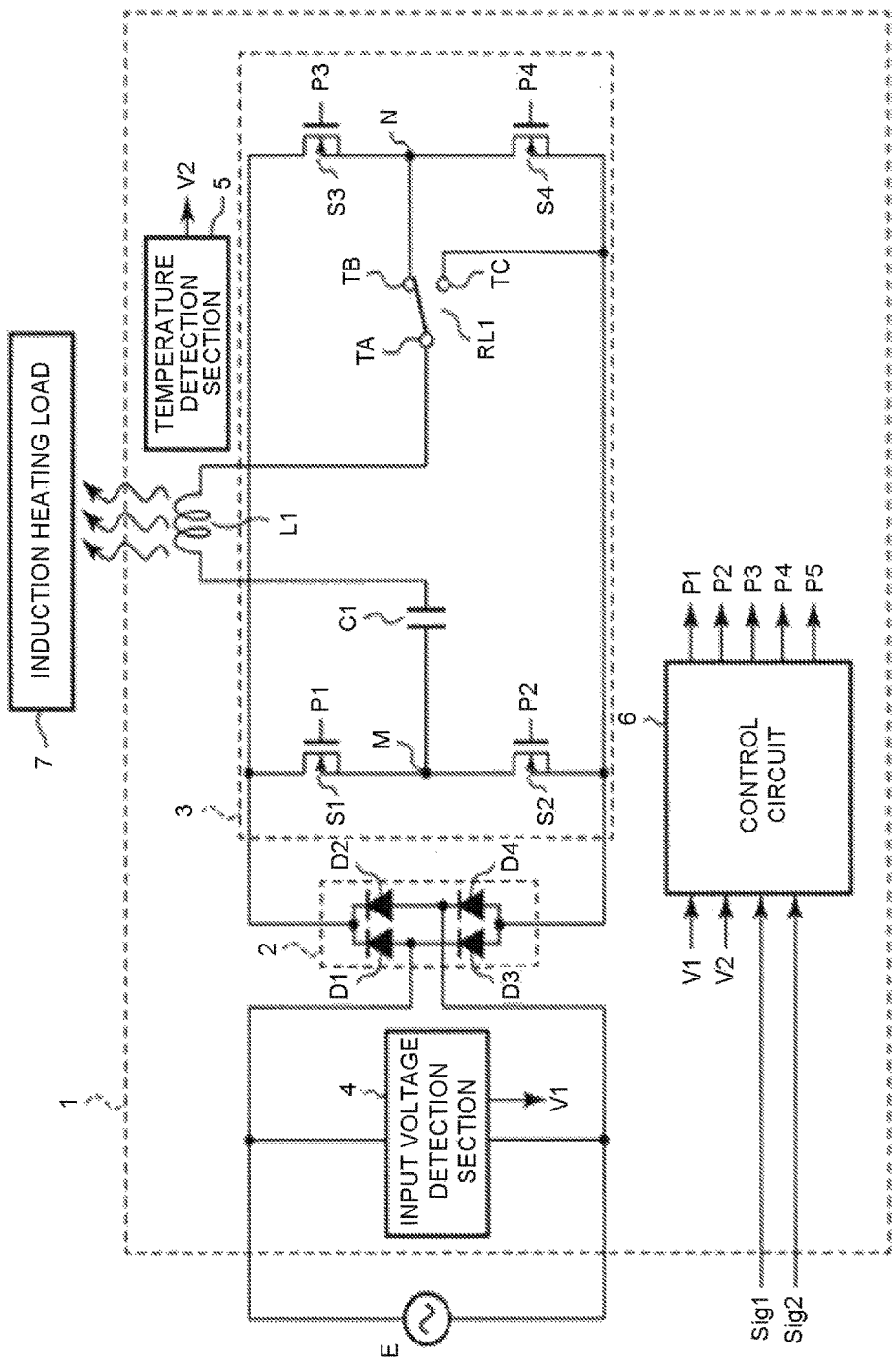
FIG. 1 is a diagram illustrating an example of the constitution of a power conversion circuit according to a first embodiment.

In accordance with an embodiment, a power conversion circuit comprises a rectifying circuit, a first switching element, a second switching element, a third switching element, a fourth switching element, a series connection of a capacitor and an induction coil, a fifth switching element, a voltage detection section and a control circuit. The rectifying circuit rectifies an AC power supply. The first switching element is connected to a positive terminal of an output terminal of the rectifying circuit. The second switching element is connected between the first switching element and a negative terminal of the output terminal of the rectifying circuit. The third switching element is connected to the positive terminal of the output terminal of the rectifying circuit. The fourth switching element is connected between the third switching element and a negative terminal of the output terminal of the rectifying circuit. One side of the series connection of the capacitor and the induction coil is connected to a first connection point which is a connection point between the first switching element and the second switching element. The fifth switching element switches a state between a first connection state in which the other side of the series connection of the capacitor and the induction coil is connected to a second connection point which is a connection point between the third switching element and the fourth switching element and a second connection state in which the other side of the series connection of the capacitor and the induction coil is connected to the output terminal of the rectifying circuit. The control circuit switches the fifth switching element between the first connection state and the second connection state based on the detection voltage by the voltage detection section and inputs a pulse signal to the first to the fourth switching elements.

Hereinafter, a power conversion circuit according to an embodiment is described. Further, in the present embodiment, the power conversion circuit is used in an image forming apparatus for forming an image with toner on a paper sheet such as a paper.

The image forming apparatus is a laser printer that executes various processing such as an image formation while conveying an image receiving medium such as the paper sheet, for example. The image forming apparatus charges a photoconductive drum and forms a latent image (electrostatic latent image) by irradiating the charged photoconductive drum with laser light according to image data (print data) for printing. In the image forming apparatus, a toner (developing agent) is attached to the latent image formed on the photoconductive drum, and the toner attached to the latent image is transferred onto the paper sheet to form a toner image on the paper sheet. In the image forming apparatus, the paper sheet on which the toner image is formed is sandwiched by fixing rollers heated to a high temperature by a heater, and the toner image formed on the paper sheet is fixed.

The power conversion circuit of the present embodiment is used to supply electric power to the heater for heating the fixing roller of the image forming apparatus. However, an object to which the power conversion circuit supplies the electric power may be optional as long as the electric power is supplied by a magnetic field generated by a high frequency current.

First Embodiment

FIG. 1 is a diagram illustrating an example of the constitution of a power conversion circuit 1 according to the first embodiment. The power conversion circuit 1 includes a full-wave rectifying circuit 2, a high frequency power conversion circuit 3, an input voltage detection section 4, a temperature detection section 5 and a control circuit 6. The power conversion circuit 1 generates a high frequency current with the electric power supplied from an AC power supply E and applies a magnetic field generated by the high frequency current to an induction heating load 7 to heat the induction heating load 7.

The full-wave rectifying circuit 2 includes a rectifying bridge constituted by, for example, a plurality of diodes (a first diode D1, a second diode D2, a third diode D3 and a fourth diode D4). A pair of input terminals of the rectifying bridge is connected to the AC power supply E. The full-wave rectifying circuit 2 full-wave rectifies an alternating voltage supplied from the AC power supply E to output a pulsated positive voltage from a pair of output terminals.

The high frequency power conversion circuit 3 generates an alternating current with a high frequency from the pulsated positive voltage. The high frequency power conversion circuit 3 includes a first switching element S1, a second switching element S2, a third switching element S3, a fourth switching element S4, a capacitor C1, an induction coil L1 and a fifth switching element RL1.

The first switching element S1, the second switching element S2, the third switching element S3 and the fourth switching element S4 are, for example, N-channel MOSFETs. Each of the first switching element S1, the second switching element S2, the third switching element S3, and the fourth switching element S4 functions as a body diode oriented from a source side to a drain side thereof. The first switching element S1, the second switching element S2, the third switching element S3 and the fourth switching element S4 may be P-channel MOSFETs, respectively. The first switching element S1, the second switching element S2, the third switching element S3 and the fourth switching element S4 may be switching elements such as IGBT, SiC, GaN-HEMT and the like. The first switching element S1, the second switching element S2, the third switching element S3 and the fourth switching element S4 may be intelligent power modules in which two switching elements are stored in one package.

The drain source of the first switching element S1 is connected to a positive pulsating output terminal (positive terminal) which is one of the pair of the output terminals of the full-wave rectifying circuit 2. The source terminal of the first switching element S1 is connected to the drain source of the second switching element S2. The source terminal of the second switching element S2 is connected to a negative pulsating output terminal which is the other of the pair of the output terminals of the full-wave rectifying circuit 2.

The drain source of the third switching element S3 is connected to the positive pulsating output terminal which is one of the pair of the output terminals of the full-wave rectifying circuit 2. The source terminal of the third switching element S3 is connected to the drain source of the fourth switching element S4. The source terminal of the fourth switching element S4 is connected to the negative pulsating output terminal which is the other of the pair of the output terminals of the full-wave rectifying circuit 2.

A connection point between the first switching element S1 and the second switching element S2 is referred to as a first connection point M, and a connection point between the third switching element S3 and the fourth switching element S4 is referred to as a second connection point N.

The fifth switching element RL1 is a selector type relay switch which includes, for example, a first terminal TA at a primary side and a second terminal TB and a third terminal TC at a secondary side. The fifth switching element RL1 switches a state between a state (first connection state) in which the first terminal TA and the second terminal TB are conducted and a state (second connection state) in which the first terminal TA and the third terminal TC are conducted under the control of the control circuit 6. In other words, the fifth switching element RL1 switches a conduction path between the primary side and the secondary side.

A series connection of the capacitor C1 and the induction coil L1 is connected in series between the first terminal TA of the fifth switching element RL1 and the first connection point M. The second terminal TB of the fifth switching element RL1 is connected to the second connection point N. The third terminal TC of the fifth switching element RL1 is connected to the negative pulsating output terminal of the full-wave rectifying circuit 2. Further, an order of the connection of the capacitor C1 and the induction coil L1 may be reverse as long as the connection of the capacitor C1 and the induction coil L1 is the series connection.

In a case in which the fifth switching element RL1 is in the first connection state, the capacitor C1 and the induction coil L1 are connected in series between the first connection point M and the second connection point N. In this case, in the high frequency power conversion circuit 3, the first switching element S1, the second switching element S2, the third switching element S3 and the fourth switching element S4 function as a full bridge inverter driven by the control circuit 6.

In a case in which the fifth switching element RL1 is in the second connection state, the capacitor C1 and the induction coil L1 are connected in series between the first connection point M and the negative pulsating output terminal of the full-wave rectifying circuit 2. In this case, in the high frequency power conversion circuit 3, the first switching element S1 and the second switching element S2 function as a half bridge inverter driven by the control circuit 6.

In a case in which the high frequency power conversion circuit 3 operates as the half bridge inverter, under the control of the control circuit 6, the first switching element S1 and the second switching element S2 are alternately turned on.

First, if the first switching element S1 is turned on and the second switching element S2 is turned off, a current flows in a closed circuit in the order of the full-wave rectifying circuit 2, the first switching element S1, the capacitor C1, the induction coil L1, the fifth switching element RL1 and the full-wave rectifying circuit 2 by the positive voltage from the full-wave rectifying circuit 2.

Next, if the first switching element S1 is turned off and the second switching element S2 is turned on, a current flows in a closed circuit in the order of the capacitor C1, the second switching element S2, the fifth switching element RL1, the induction coil L1 and the capacitor C1 by a potential of the capacitor C1. In other words, if the first switching element S1 is turned off and the second switching element S2 is turned on, a current flows through the induction coil L1 in an opposite direction to that in a case in which the first switching element S1 is turned on and the second switching element S2 is turned off.

As stated above, in a case in which the high frequency power conversion circuit 3 operates as the half bridge inverter, the direction of the current flowing through the induction coil L1 is switched in synchronization with switching cycles of the first switching element S1 and the second switching element S2. As a result, the high frequency power conversion circuit 3 can enable the induction heating load 7 to generate heat by the magnetic field generated in the induction coil L1.

In a case in which the high frequency power conversion circuit 3 operates as the full bridge inverter, under the control of the control circuit 6, a combination of the first switching element S1 and the fourth switching element S4 and a combination of the second switching element S2 and the third switching element S3 are alternately turned on.

First, if the first switching element S1 and the fourth switching element S4 are turned on, and the second switching element S2 and the third switching element S3 are turned off, by the positive voltage from the full-wave rectifying circuit 2, a current flows in the order of the full-wave rectifying circuit 2, the first switching element S1, the capacitor C1, the induction coil L1, the fifth switching element RL1, the fourth switching element S4 and the full-wave rectifying circuit 2.

Next, if the first switching element S1 and the fourth switching element S4 are turned off, and the second switching element S2 and the third switching element S3 are turned on, by the positive voltage from the full-wave rectifying circuit 2, the current flows in the order of the full-wave rectifying circuit 2, the third switching element S3, the fifth switching element RL1, the induction coil L1, the capacitor C1, the second switching element S2 and the full-wave rectifying circuit 2. In other words, if the first switching element S1 and the fourth switching element S4 are turned off and the second switching element S2 and the third switching element S3 are turned on, a current flows through the induction coil L1 in an opposite direction to that in a case in which the first switching element S1 and the fourth switching element S4 are turned on and the second switching element S2 and the third switching element S3 are turned off.

As stated above, in a case in which the high frequency power conversion circuit 3 operates as the full bridge inverter, the direction of the current flowing through the induction coil L1 is switched in synchronization with switching cycles of the combination of the first switching element S1 and the fourth switching element S4 and the combination of the second switching element S2 and the third switching element S3. As a result, the high frequency power conversion circuit 3 can enable the induction heating load 7 to generate heat by the magnetic field generated in the induction coil L1.

In a case in which the high frequency power conversion circuit 3 operates as the full bridge inverter, by the positive voltage from the full-wave rectifying circuit 2 instead of the potential of the capacitor C1, the current in the opposite direction flows through the induction coil L1. In other words, the high frequency power conversion circuit 3 operating as the full bridge inverter can obtain larger electric power than that obtained from the same input voltage compared with a case in which the high frequency power conversion circuit 3 operates as the half bridge inverter. Furthermore, in the present embodiment, the high frequency power conversion circuit 3 operating as the full bridge inverter can obtain nearly twice the electric power compared with a case in which the high frequency power conversion circuit 3 operates as the half bridge inverter.

The input voltage detection section 4 detects an effective value (detected voltage) of a voltage of the AC power supply input to the power conversion circuit 1 to output a detected voltage V1 to the control circuit 6. The input voltage detection section 4 is provided with a plurality of resistances connected in series.

In a case in which the input voltage detection section 4 is constituted as an analog circuit, a voltage applied to both terminals of a part of resistances in the plurality of the resistances connected in series is output as the detected voltage V1. In this case, the detected voltage V1 is a value that is converted to a low voltage calculated according to a resistance division ratio.

In a case in which the input voltage detection section 4 is constituted as a digital circuit, the detected voltage V1 applied to both terminals of a part of resistances in the plurality of the resistances connected in series is converted to a value indicating the detected voltage V1 by a D/A converter. The input voltage detection section 4 transmits the value indicating the detected voltage V1 as a serial signal or a parallel signal to the control circuit 6 via an insulation bus. The input voltage detection section 4 may transmit the value indicating the detected voltage V1 to the control circuit 6 in a case in which a request is received from the control circuit 6 or may frequently transmit the value indicating the detected voltage V1 to the control circuit 6.

The temperature detection section 5 detects a temperature of the induction heating load 7 to output a detected temperature V2 to the control circuit 6. The temperature detection section 5 is provided with, for example, two types of metal wires such as thermocouples.

In a case in which the temperature detection section 5 is constituted by the analog circuit, a potential difference generated between the two types of metal wires is output as the detected temperature V2. The temperature detection section 5 may output a value obtained by amplifying the potential difference generated between the two types of metal wires with an operational amplifier as the detected temperature V2. In this way, by amplifying the potential difference generated between the two types of metal wires with the operational amplifier, S/N ratio can be improved.

In a case in which the temperature detection section 5 is constituted by the digital circuit, the potential difference generated between the two types of metal wires is converted to a value indicating the detected temperature V2 by the D/A converter. The temperature detection section 5 transmits the value indicating the detected temperature V2 as a serial signal or a parallel signal to the control circuit 6 via the insulation bus. The temperature detection section 5 may transmit the value indicating the detected temperature V2 to the control circuit 6 in a case in which a request is received from the control circuit 6 or may frequently transmit the value indicating the detected temperature V2 to the control circuit 6.

The control circuit 6 controls an operation of each switching element of the power conversion circuit 1. Signals input to the control circuit 6 include the detected voltage V1, the detected temperature V2, an operation mode command signal Sig1 and a frequency designation signal Sig2. The detected voltage V1 is a voltage value of the AC power supply detected by the input voltage detection section 4. The detected temperature V2 is the temperature of the induction heating load 7 detected by the temperature detection section 5. The operation mode command signal Sig1 is a control signal supplied from a controller of the image forming apparatus. The operation mode command signal Sig1 is a signal for the controller of the image forming apparatus to instruct whether the high frequency power conversion circuit 3 functions as the full bridge inverter or as the half bridge inverter. The frequency designation signal Sig2 is a control signal supplied from the controller of the image forming apparatus. The frequency designation signal Sig2 is a signal for the controller of the image forming apparatus to instruct switching frequencies of the first switching element S1, the second switching element S2, the third switching element S3 and the fourth switching element S4.

The control circuit 6 controls operations of the first switching element S1, the second switching element S2, the third switching element S3, the fourth switching element S4 and the fifth switching element RL1 based on any or a plurality of the above input signals. A signal of Low level (L level) may be replaced with a logic value "0". A signal of High level (H level) may be replaced with a logic value "1".

Figure 2:
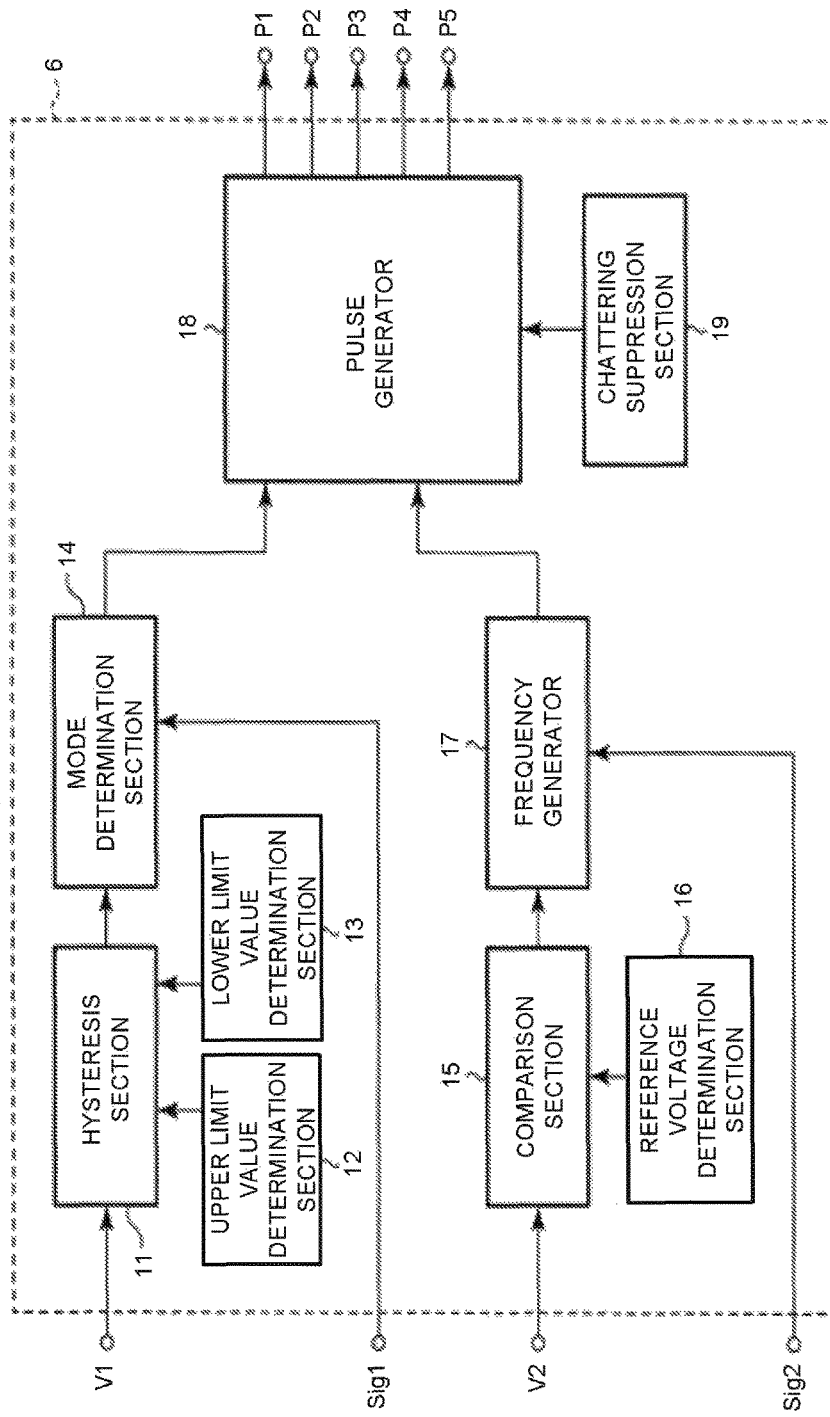
FIG. 2 is a diagram illustrating an example of the constitution of a control circuit according to the first embodiment.

FIG. 2 is a diagram illustrating an example of the constitution of the control circuit 6 according to the first embodiment. The control circuit 6 includes a hysteresis section 11, an upper limit value determination section 12, a lower limit value determination section 13, a mode determination section 14, a comparison section 15, a reference voltage determination section 16, a frequency generator 17, a pulse generator 18 and a chattering suppression section 19.

The hysteresis section 11 supplies an output in response to a comparison result between the detected voltage V1 and an upper limit value determined by the upper limit value determination section 12 and a lower limit value determined by the lower limit value determination section 13 to the mode determination section 14. For example, the hysteresis section 11 outputs an H level signal in a case in which the detected voltage V1 becomes equal to or greater than the upper limit value determined by the upper limit value determination section 12 from a state of being smaller than the upper limit value determined by the upper limit value determination section 12 and equal to or greater than the lower limit value determined by the lower limit value determination section 13. The hysteresis section 11 outputs an L level signal in a case in which the detected voltage V1 becomes smaller than the lower limit value determined by the lower limit value determination section 13 from a state of being smaller than the upper limit value determined by the upper limit value determination section 12 and equal to or greater than the lower limit value determined by the lower limit value determination section 13.

The upper limit value supplied by the upper limit value determination section 12 to the hysteresis section 11 may be an analog signal or a digital signal. In a case in which the upper limit value determination section 12 supplies the upper limit value which is the analog signal to the hysteresis section 11, the upper limit value determination section 12 supplies a voltage clamped by voltage of a Zener diode as a signal of the upper limit value to the hysteresis section 11 in a series connection of the resistance and the Zener diode. In a case in which the upper limit value determination section 12 supplies the upper limit value which is the digital signal to the hysteresis section 11, the upper limit value determination section 12 supplies the digital upper limit value set in a latch IC, a memory IC or a register in a microcomputer to the hysteresis section 11. The upper limit value determination section 12 may transmit the upper limit value to the hysteresis section 11 in a case in which a request is received from the hysteresis section 11, or may frequently transmit the upper limit value to the hysteresis section 11.

The hysteresis section 11 may be constituted by either a digital circuit or an analog circuit.

In a case in which the hysteresis section 11 is constituted by the analog circuit, the hysteresis section 11 includes a plurality of differential amplifiers. The hysteresis section 11 inputs the detected voltage V1 to one side of one differential amplifier and inputs the upper limit value determined by the upper limit value determination section 12 to the other side thereof. The hysteresis section 11 sets the differential amplifier in such a manner that an output of the differential amplifier becomes H level in a case in which the detected voltage V1 exceeds the upper limit value. The hysteresis section 11 inputs the detected voltage V1 to one side of other differential amplifiers and inputs the lower limit value determined by the lower limit value determination section 13 to the other side thereof. The hysteresis section 11 sets the differential amplifier in such a manner that the output of the differential amplifier becomes H level in a case in which the detected voltage V1 exceeds the lower limit value.

The hysteresis section 11 connects the output terminals of two differential amplifiers with input terminals of a RS flip-flop circuit which is the analog circuit. The RS flip-flop circuit changes a state held at the time the output of either of the two differential amplifiers becomes H level. For example, in a case in which the output of the differential amplifier to which the upper limit value determined by the upper limit value determination section 12 is input is H level, the RS flip-flop circuit discards a value of the RS flip-flop kept until then and keeps H level newly. For example, in a case in which the output of the differential amplifier to which the lower limit value determined by the lower limit value determination section 13 is input is H level, the RS flip-flop circuit discards a value of the RS flip-flop kept until then and keeps L level newly. For example, in a case in which both the output of the differential amplifier to which the upper limit value determined by the upper limit value determination section 12 is input and the output of the differential amplifier to which the lower limit value determined by the lower limit value determination section 13 is input are H level, the RS flip-flop circuit keeps the value of the RS flip-flop kept until then.

In a case in which the hysteresis section 11 is constituted by the digital circuit, the hysteresis section 11 carries out the above processing by execution of a program stored in a memory by an arithmetic element. In a case in which the detected voltage V1, the upper limit value and the lower limit value input to the hysteresis section 11 are analog signals, the hysteresis section 11 acquires a digital value corresponding to a signal input by an A/D converter. The hysteresis section 11 uses the digital values of the detected voltage V1, the upper limit value and the lower limit value to execute a program constituted by a programming language such as an IF sentence or a Case sentence.

The program executed by the hysteresis section 11 is, for example, as follows.
Loop{
Case upper limit value<V1
Set Output=1;
Case lower limit value>V1
Set Output=0;
End case
}

By executing the above program, the hysteresis section 11 outputs the H level signal in a case in which the detected voltage V1 becomes equal to or greater than the upper limit value determined by the upper limit value determination section 12 from a state of being smaller than the upper limit value determined by the upper limit value determination section 12 and equal to or greater than the lower limit value determined by the lower limit value determination section 13, outputs the L level signal in a case in which the detected voltage V1 becomes smaller than the lower limit value determined by the lower limit value determination section 13 from a state of being smaller than the upper limit value determined by the upper limit value determination section 12 and equal to or greater than the lower limit value determined by the lower limit value determination section 13, and does not change the output in a case in which these conditions are not met. In other words, the hysteresis section 11 does not change the output in a case in which the detected voltage V1 changes in a range equal to or greater than the lower limit value and smaller than the upper limit value.

The mode determination section 14 determines whether the high frequency power conversion circuit 3 functions as the full bridge inverter or as the half bridge inverter. The mode determination section 14 supplies the L level signal to the pulse generator 18 in a case in which the high frequency power conversion circuit 3 functions as the full bridge inverter. The mode determination section 14 supplies the H level signal to the pulse generator 18 in a case in which the high frequency power conversion circuit 3 functions as the half bridge inverter.

The output of the hysteresis section 11 and the operation mode command signal Sig1 are input to the mode determination section 14. The mode determination section 14 determines whether the high frequency power conversion circuit 3 functions as the full bridge inverter or as the half bridge inverter based on the output (hysteresis output) of the hysteresis section 11 and the operation mode command signal Sig1.

The mode determination section 14 determines whether the high frequency power conversion circuit 3 functions as the full bridge inverter or as the half bridge inverter based on the operation mode command signal Sig1 in a case in which the hysteresis output is H level. For example, the mode determination section 14 supplies the operation mode command signal Sig1 to the pulse generator 18 without any change in a case in which the hysteresis output is H level. The mode determination section 14 supplies the H level signal to the pulse generator 18 in a case in which the hysteresis output is H level and the operation mode command signal Sig1 is H level instructing that the high frequency power conversion circuit 3 functions as the half bridge inverter. The mode determination section 14 supplies the L level signal to the pulse generator 18 in a case in which the hysteresis output is H level and the operation mode command signal Sig1 is L level instructing that the high frequency power conversion circuit 3 functions as the full bridge inverter.

The mode determination section 14 determines that the high frequency power conversion circuit 3 functions as the full bridge inverter regardless of the operation mode command signal Sig1 in a case in which the hysteresis output is L level. In this case, the mode determination section 14 supplies the L level signal to the pulse generator 18.

The mode determination section 14 may be constituted by either the digital circuit or the analog circuit.

In a case in which the mode determination section 14 is constituted by the analog circuit, the mode determination section 14 is provided with a diode of which a cathode is connected to the output terminal of the hysteresis section 11 and an anode is connected to an output terminal of the mode determination section 14. The mode determination section 14 is provided with a resistance inserted between input terminals of the operation mode command signal Sig1. With such a configuration, in a case in which the H level signal is output from the hysteresis section 11, a signal from the operation mode command signal Sig1 becomes dominant. With such a configuration, in a case in which the L level signal is output from the hysteresis section 11, the mode determination section 14 forcibly outputs the L level signal to the pulse generator 18. In this way, the mode determination section 14 can prioritize signals with the analog circuit.

In a case in which the mode determination section 14 is constituted by the digital circuit, the mode determination section 14 carries out the above processing by execution of a program stored in a memory by an arithmetic element. The mode determination section 14 uses the output (hysteresis output) of the hysteresis section 11 and the value of the operation mode command signal Sig1 to execute a program constituted by a programming language such as an IF sentence to output a signal (mode output) indicating the mode.

The program executed by the mode determination section 14 is, for example, as follows.

IF (hysteresis output=L) {mode output=L;}
Else
IF (
   IF (Sig1=H) {mode output=H;}
   Else {mode output=L;}))
)
)

The mode determination section 14 executes a program of an IF sentence of a dual structure as described above to prioritize the input signals and then can supply a signal (mode output) indicating whether the high frequency power conversion circuit 3 functions as the full bridge inverter or as the half bridge inverter to the pulse generator 18.

The comparison section 15 supplies a signal in response to a comparison result between the detected temperature V2 and a reference voltage determined by the reference voltage determination section 16 to the frequency generator 17. For example, the comparison section 15 outputs either of the H level signal and the L level signal according to whether the potential of the detected temperature V2 is the reference voltage determined by the reference voltage determination section 16. The H level signal output by the comparison section 15 is a signal for instructing the frequency generator 17 to increase the switching frequencies of the switching elements of the high frequency power conversion circuit 3. The L level signal output by the comparison section 15 is a signal for instructing the frequency generator 17 to decrease the switching frequencies of the switching elements of the high frequency power conversion circuit 3.

The output of the high frequency power conversion circuit 3 becomes large as the switching frequencies of the switching elements of the high frequency power conversion circuit 3 approach a resonance point of the capacitor C1 and the induction coil L1. Thus, the comparison section 15 can control the output of the high frequency power conversion circuit 3 depending on which of the H level signal and the L level signal is output. For example, the comparison section 15 outputs the H level signal in a case in which the potential of the detected temperature V2 is equal to or greater than the reference voltage determined by the reference voltage determination section 16. Thus, the comparison section 15 can decrease the output of the high frequency power conversion circuit 3 in a case in which the temperature of the induction heating load 7 exceeds a reference. For example, the comparison section 15 outputs the L level signal in a case in which the potential of the detected temperature V2 is smaller than the reference voltage determined by the reference voltage determination section 16. Thus, the comparison section 15 can increase the output of the high frequency power conversion circuit 3 in a case in which the temperature of the induction heating load 7 is smaller than the reference.

The comparison section 15 may be constituted by either the digital circuit or the analog circuit.

In a case in which the comparison section 15 is constituted by the analog circuit, the comparison section 15 includes a differential amplifier or a two-input comparator. The detected temperature V2 is input to one input terminal of the differential amplifier or the two-input comparator, and the reference voltage is input to the other input terminal thereof. The differential amplifier or the two-input comparator outputs a signal in response to a difference of the two input terminals. Specifically, the differential amplifier or the two-input comparator outputs the H level signal in a case in which the detected temperature V2 is equal to or greater than the reference voltage, and outputs the L level signal in a case in which the detected temperature V2 is smaller than the reference voltage.

In a case in which the comparison section 15 is constituted by the digital circuit, the comparison section 15 executes the above processing by the execution of a program stored in a memory by an arithmetic element. The comparison section 15 acquires a digital value corresponding to a signal input by the A/D converter in a case in which the detected temperature V2 and the reference voltage input to the comparison section 15 are analog signals. The comparison section 15 sets the reference voltage in a register and executes a program constituted by a programming language such as an IF sentence by using the digital value of the detected temperature V2.

The program executed by the comparison section 15 is, for example, as follows.
 Vref=reference voltage
 IF (V2>Vref) {comparison section output=H;}
 Else {comparison section output=L;}

By executing the program of the IF sentence as described above, the comparison section 15 can adjust the output of the high frequency power conversion circuit 3 according to the temperature of the induction heating load 7. The comparison section 15 may output a signal in response to a difference between the detected temperature V2 and the reference voltage without outputting either of the H level signal and the L level signal.

The frequency generator 17 controls the switching frequencies of the switching elements of the high frequency power conversion circuit 3. The frequency generator 17 controls the switching frequencies of the switching elements of the high frequency power conversion circuit 3 based on a signal output from the comparison section 15 and the frequency designation signal Sig2. The frequency generator 17 controls a frequency of the pulse signal output from the control circuit 6 based on the signal output from the comparison section 15 and the frequency designation signal Sig2.

For example, the frequency generator 17 controls the switching frequencies of the switching elements of the high frequency power conversion circuit 3 based on the frequency designation signal Sig2 in a case in which the value of the detected temperature V2 is within a normal range. Specifically, the frequency generator 17 outputs information indicating the frequency indicated by the frequency designation signal Sig2 to the pulse generator 18. Further, for example, in a case in which the frequency designation signal Sig2 is binary including the H level and the L level, the frequency generator 17 outputs information indicating either of a frequency (high frequency) corresponding to the H level and a frequency (low frequency) corresponding to the L level to the pulse generator 18. The frequency designation signal Sig2 may not be binary and may further have other values.

For example, the frequency generator 17 controls the switching frequencies of the switching elements of the high frequency power conversion circuit 3 based on the signal output from the comparison section 15 in a case in which the detected temperature V2 is within an abnormal range. Specifically, the frequency generator 17 determines that the temperature of the induction heating load 7 is within the abnormal range in a case in which the value of the detected temperature V2 is equal to or greater than the reference voltage. In this case, the H level signal is output from the comparison section 15. The frequency generator 17 increases the switching frequencies of the switching elements of the high frequency power conversion circuit 3 regardless of the frequency designation signal Sig2 in a case in which the H level signal is output from the comparison section 15.

The frequency generator 17 may be constituted by either the digital circuit or the analog circuit.

In a case in which the frequency generator 17 is constituted by the analog circuit, the frequency generator 17 includes a diode of which an anode is connected to the output terminal of the comparison section 15 and a cathode is connected to an input terminal of the frequency generator 17. Further, the frequency generator 17 includes a resistance connected between the input terminal of the frequency designation signal Sig2 and the frequency generator 17. In a case in which the comparison section 15 outputs the H level signal to the frequency generator 17 constituted as stated above, regardless of the state of the frequency designation signal Sig2, the H level signal is transmitted to the frequency generator 17. In a case in which the comparison section 15 outputs the L level signal to the frequency generator 17, the frequency designation signal Sig2 is transmitted to the frequency generator 17.

In a case in which the frequency generator 17 is constituted by the digital circuit, the frequency generator 17 executes the above processing by the execution of a program stored in a memory by an arithmetic element. The frequency generator 17 uses the output (comparison section output) of the comparison section 15 and the value of the frequency designation signal Sig2 to execute a program constituted by a programming language such as an IF sentence to output a signal (frequency generator output) indicating the frequency.

The program executed by the frequency generator 17 is, for example, as follows.
 IF (comparison section output=H) {frequency generator output=high frequency;}
 Else {frequency generator output=frequency of value of Sig1;}

The pulse generator 18 generates a control signal P1, a control signal P2, a control signal P3, a control signal P4 and a control signal P5 based on the frequency generator output from the frequency generator 17 and the mode output from the mode determination section 14.

The control signal P1 is input to agate of the first switching element S1. In a case in which the control signal P1 is H level, the first switching element S1 is turned on; and in a case in which the control signal P1 is L level, the first switching element S1 is turned off.

The control signal P2 is input to a gate of the second switching element S2. In a case in which the control signal P2 is H level, the second switching element S2 is turned on; and in a case in which the control signal P2 is L level, the second switching element S2 is turned off.

The control signal P3 is input to a gate of the third switching element S3. In a case in which the control signal P3 is H level, the third switching element S3 is turned on; and in a case in which the control signal P3 is L level, the third switching element S3 is turned off.

The control signal P4 is input to a gate of the fourth switching element S4. In a case in which the control signal P4 is H level, the fourth switching element S4 is turned on; and in a case in which the control signal P4 is L level, the fourth switching element S4 is turned off.

The control signal P5 is a signal to operate the fifth switching element RL1. In a case in which the control signal P5 is L level, the fifth switching element RL1 becomes the first connection state; and in a case in which the control signal P5 is the H level, the fifth switching element RL1 becomes the second connection state.

The pulse generator 18 enables the high frequency power conversion circuit 3 to operate as the full bridge inverter in a case in which the mode output from the mode determination section 14 is L level. In a case in which the high frequency power conversion circuit 3 operates as the full bridge inverter, the pulse generator 18 generates a pulse signal with a frequency determined based on the frequency generator output as the control signal P1. The pulse generator 18 generates a pulse signal with a phase inverted to that of the control signal P1 as the control signal P2. The pulse generator 18 generates a pulse signal with a phase inverted to that of the control signal P1 and synchronized with that of the control signal P2 as the control signal P3. The pulse generator 18 generates a pulse signal with a phase inverted to that of the control signal P2 and the control signal P3 and synchronized with the control signal P1 as the control signal P4. The pulse generator 18 generates the control signal P5 of the L level.

The pulse generator 18 inputs the control signal P5 of the L level to the fifth switching element RL1 to set the fifth switching element RL1 to the first connection state and enables the high frequency power conversion circuit 3 to operate as the full bridge inverter by inputting the control signal P1 to the control signal P4 respectively to the first switching element S1 to the fourth switching element S4.

The pulse generator 18 enables the high frequency power conversion circuit 3 to operate as the half bridge inverter in a case in which the mode output from the mode determination section 14 is H level. The pulse generator 18 generates a pulse signal with a frequency determined based on the frequency generator output as the control signal P1 in a case in which the high frequency power conversion circuit 3 operates as the half bridge inverter. The pulse generator 18 generates a pulse signal with a phase inverted to that of the control signal P1 as the control signal P2. The pulse generator 18 generates the control signal P5 of the H level.

The pulse generator 18 inputs the control signal P5 of the H level to the fifth switching element RL1 to set the fifth switching element RL1 to the second connection state, and enables the high frequency power conversion circuit 3 to operate as the half bridge inverter by inputting the control signal P1 and the control signal P2 respectively to the first switching element S1 and the second switching element S2.

As stated above, the pulse generator 18 controls the control signals P1 to P5 to switch a state between a state in which the fifth switching element is in the second connection state and the first switching element S1 and the second switching element S2 are alternately turned on (a state of enabling the high frequency power conversion circuit 3 to operate as the half bridge inverter) and a state in which the fifth switching element is in the first connection state and the combination of the first switching element S1 and the fourth switching element S4 and the combination of the second switching element S2 and the third switching element S3 are alternately turned on (a state of enabling the high frequency power conversion circuit 3 to operate as the full bridge inverter).

The pulse generator 18 may be constituted by either the digital circuit or the analog circuit.

In a case in which the pulse generator 18 is constituted by the analog circuit, The pulse generator 18 switches a state between a state of enabling the high frequency power conversion circuit 3 to operate as the full bridge inverter and a state of enabling the high frequency power conversion circuit 3 to operate as the half bridge inverter by switching presence or absence of the control signals P1 to P4 with a selector circuit.

In a case in which the pulse generator 18 is constituted by the digital circuit, the pulse generator 18 switches a state between a state of enabling the high frequency power conversion circuit 3 to operate as the full bridge inverter and a state of enabling the high frequency power conversion circuit 3 to operate as the half bridge inverter by execution of a program constituted by a programming language such as an IF sentence or a Case sentence by an arithmetic element.

The chattering suppression section 19 is used in the control for suppressing an influence by chattering. There is a possibility that the chattering occurs at the time the fifth switching element RL1 which is a relay switch switches a state from the first connection state to the second connection state. While the chattering occurs, in the fifth switching element RL1, the first connection state and the second connection state become indefinite. In a case in which the chattering occurs and the fifth switching element RL1 is temporarily in the second connection state, the current flows in the order of the connection point M, the capacitor C1, the induction coil L1, the fifth switching element RL1 and the negative terminal of the full-wave rectifying circuit 2. However, at the time the chattering occurs and the fifth switching element RL1 is temporarily in the first connection state, in a case in which the fourth switching element S4 is not turned on, the path of the previous current from the connection point N does not exist. Thus, there is a possibility that the chattering may adversely affect the high frequency power conversion circuit 3.

Thus, the chattering suppression section 19 supplies a time constant TL indicating time at which the fourth switching element S4 is turned on to the pulse generator 18 at the time of switching the state from the first connection state to the second connection state. The time constant TL which is sufficient for the chattering to converge is adjusted according to characteristics of the fifth switching element RL1. For example, the time constant TL may be about 1 ms.

The pulse generator 18 conducts the fourth switching element S4 only for the time corresponding to the time constant TL supplied from the chattering suppression section 19 at the time of switching the fifth switching element RL1 from the first connection state to the second connection state. In other words, the pulse generator 18 sets the control signal P4 input to the fourth switching element S4 to H level only for the time corresponding to the time constant TL from a timing at which the control signal P5 is switched from the L level to the H level.

With such a configuration, as the fourth switching element S4 is turned on at the time of the occurrence of the chattering, even if the fifth switching element RL1 is temporarily in the first connection state, a current flows in the order of the connection point M, the capacitor C1, the induction coil L1, the fifth switching element RL1, the connection point N, the fourth switching element S4 and the negative terminal of the full-wave rectifying circuit 2. As a result, the chattering suppression section 19 can suppress the influence of the chattering occurring in the high frequency power conversion circuit 3.

The chattering suppression section 19 may be constituted by either the digital circuit or the analog circuit.

In a case in which the chattering suppression section 19 is constituted by the analog circuit, the chattering suppression section 19 can use a time constant of a RC circuit constituted by the capacitor and the resistance. For example, the chattering suppression section 19 uses a both-end voltage of the capacitor which rises with elapse of the time to supply the time constant TL to the pulse generator 18 in a case in which a direct voltage is applied to both ends of the circuit in which the capacitor and the resistance are connected in series. With such a configuration, the chattering suppression section 19 can supply the time constant TL to the pulse generator 18 by replacing the time elapse with an analog value called the both-end voltage of the capacitor. In a case in which the chattering suppression section 19 is constituted as stated above, it is possible to adjust the time constant TL by changing the values of the capacitor and the resistance.

In a case in which the chattering suppression section 19 is constituted by the digital circuit, the chattering suppression section 19 uses time function on a program to supply the time constant TL to the pulse generator 18, for example. The chattering suppression section 19 uses a function "time ( )" to sample the elapsed time and enables a processing such as exiting a loop and the like in a case in which the sampled time reaches a preset time constant TL.

In the above example, the control circuit 6 controls the high frequency power conversion circuit 3 by the hysteresis section 11, the upper limit value determination section 12, the lower limit value determination section 13, the mode determination section 14, the comparison section 15, the reference voltage determination section 16, the frequency generator 17, the pulse generator 18 and the chattering suppression section 19; however, it is not limited to this constitution. The control circuit 6 may include a CPU, a ROM, a RAM and a nonvolatile memory instead of the hysteresis section 11, the upper limit value determination section 12, the lower limit value determination section 13, the mode determination section 14, the comparison section 15, the reference voltage determination section 16, the frequency generator 17, the pulse generator 18 and the chattering suppression section 19.

The CPU is an arithmetic element (for example, a processor) that executes an arithmetic processing. The CPU executes various processing based on data of a program and the like stored in the ROM or the nonvolatile memory. The CPU functions as a control circuit capable of executing various operations by executing a program stored in the ROM or the nonvolatile memory.

The ROM is the nonvolatile memory for read only. The ROM stores a program and data used in the program.

The RAM is a volatile memory that functions as a working memory. The RAM temporarily stores data being processed by the CPU. Further, the RAM temporarily stores the program executed by the CPU.

The nonvolatile memory is a storage medium capable of storing various information. The nonvolatile memory stores a program and the data used in the program. The nonvolatile memory is, for example, an SSD (solid state drive), an HDD (Hard Disk Drive), or other storage device. Instead of the nonvolatile memory, a memory I/F such as a card slot into which a storage medium such as a memory card can be inserted may be provided.

The control circuit 6 may realize the functions of the hysteresis section 11, the upper limit value determination section 12, the lower limit value determination section 13, the mode determination section 14, the comparison section 15, the reference voltage determination section 16, the frequency generator 17, the pulse generator 18 and the chattering suppression section 19 by executing the program stored in the ROM and the nonvolatile memory by the CPU.

Next, the operation of the control circuit 6 of the power conversion circuit 1 is described.

Figure 3A:
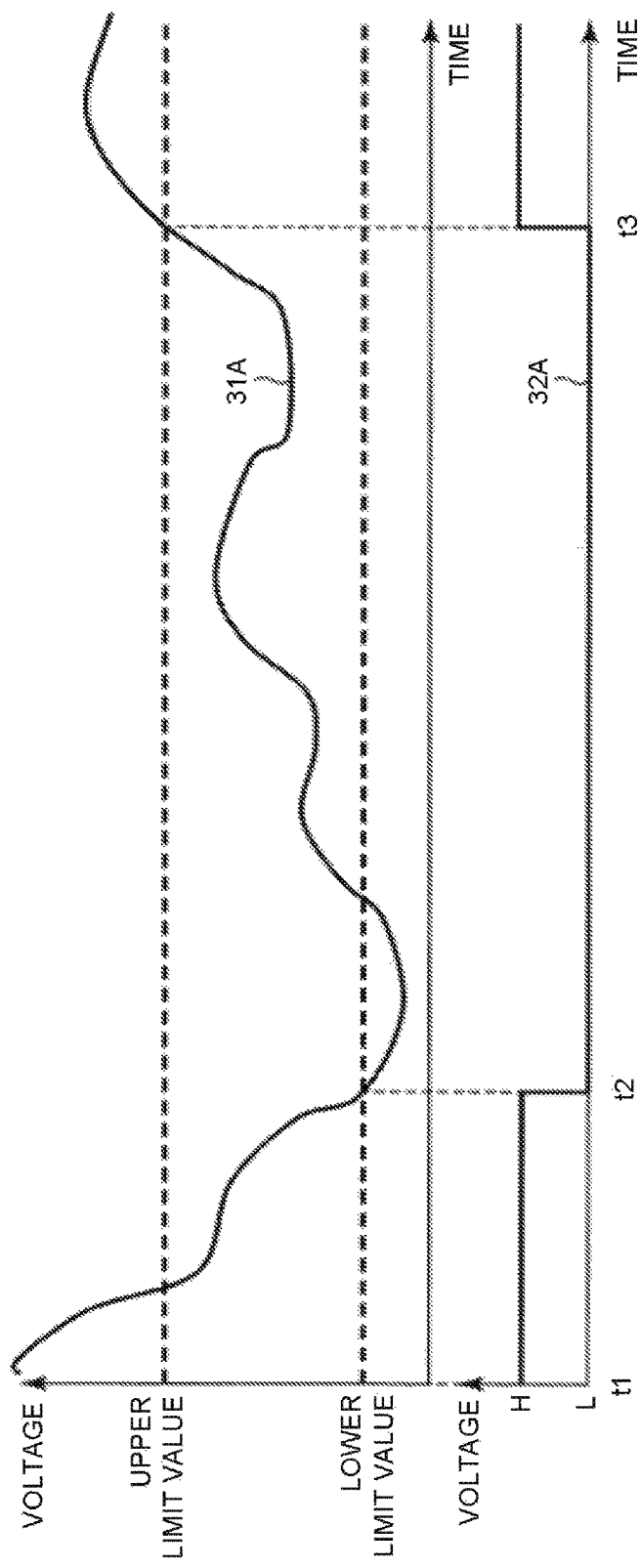
FIG. 3A is a diagram illustrating an example of the operation of the control circuit according to the first embodiment.

FIG. 3A is a diagram illustrating an example of the operation of the hysteresis section 11 of the control circuit 6. In a graph 31A in FIG. 3A, an example of the detected voltage V1 which is the analog signal detected by the input voltage detection section 4 is shown. A horizontal axis in the graph 31A represents time and a vertical axis represents the voltage. A graph 32A in FIG. 3A indicates an example of the hysteresis output. A horizontal axis in the graph 32A represents time and a vertical axis represents the voltage.

At a timing t1 in FIG. 3A, the detected voltage V1 is equal to or greater than the upper limit value determined by the upper limit value determination section 12. In this case, the hysteresis section 11 outputs the H level signal indicating the half bridge to the hysteresis output.

At a timing t2, the detected voltage V1 is smaller than the lower limit value determined by the lower limit value determination section 13. In other words, at the timing t2, the detected voltage V1 is smaller than the lower limit value determined by the lower limit value determination section 13 from a state of being smaller than the upper limit value determined by the upper limit value determination section 12 and equal to or greater than the lower limit value determined by the lower limit value determination section 13. In this case, the hysteresis section 11 outputs the L level signal indicating the full bridge as the hysteresis output.

At a timing t3, the detected voltage V1 is equal to or greater than the upper limit value determined by the upper limit value determination section 12. At the timing t3, the detected voltage V1 is equal to or greater than the upper limit value determined by the upper limit value determination section 12 from a state of being smaller than the upper limit value determined by the upper limit value determination section 12 and equal to or greater than the lower limit value determined by the lower limit value determination section 13. In this case, the hysteresis section 11 outputs the H level signal indicating the half bridge as the hysteresis output.

Figure 3B:
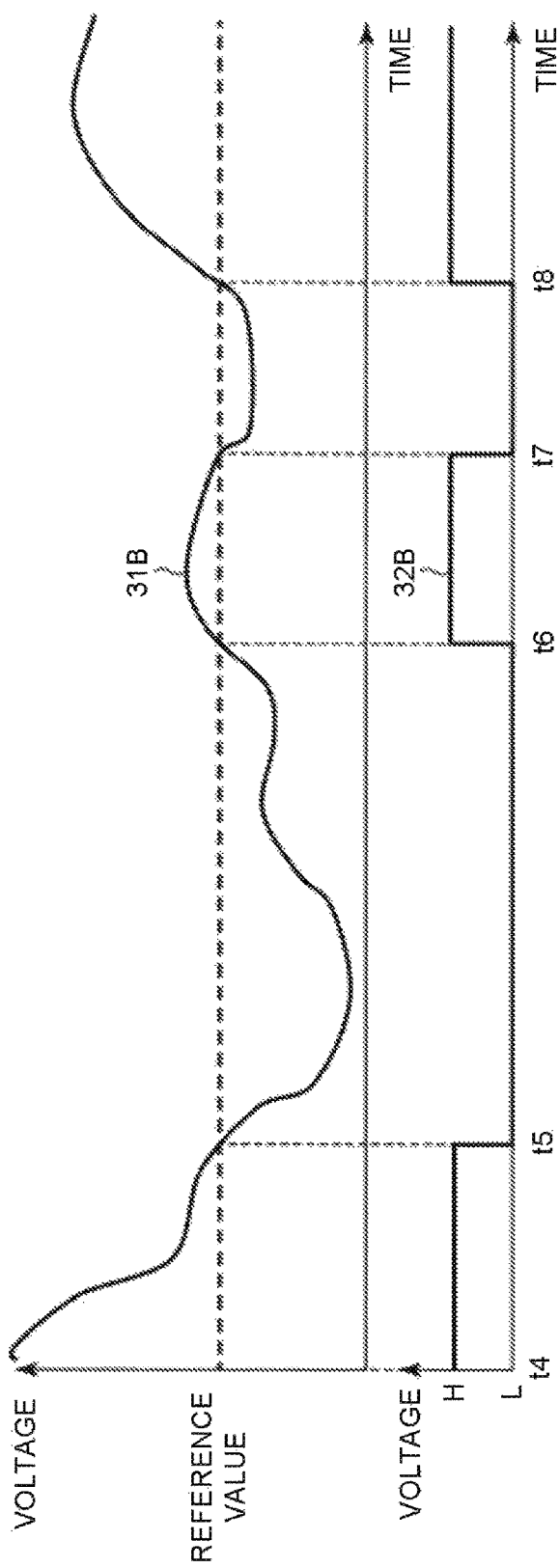
FIG. 3B is a diagram illustrating another example of the operation of the control circuit according to the first embodiment.

Further, the hysteresis section 11 may execute other operations. FIG. 3B is a diagram illustrating another example of the operation of the hysteresis section 11 of the control circuit 6 of the power conversion circuit 1. In the example, the hysteresis section 11 recognizes either of the upper limit value determined by the upper limit value determination section 12 and the lower limit value determined by the lower limit value determination section 13 as a reference value to switch the hysteresis output between the H level and the L level depending on whether the detected voltage V1 is equal to or greater than the reference value.

The mode determination section 14 supplies the H level signal indicating the half bridge to the pulse generator 18 in a case in which the hysteresis output is H level and the operation mode command signal Sig1 is H level. In a case in which the hysteresis output is H level and the operation mode command signal Sig1 is L level, the mode determination section 14 supplies the L level signal indicating the full bridge to the pulse generator 18. The mode determination section 14 supplies the L level signal indicating the full bridge to the pulse generator 18 regardless of the operation mode command signal Sig1 in a case in which the hysteresis output is L level.

FIG. 3B is a diagram illustrating another example of the operation of the hysteresis section 11 of the control circuit 6. In a graph 31B in FIG. 3B, an example of the detected voltage V1 which is the analog signal detected by the input voltage detection section 4 is shown. A horizontal axis in the graph 31B represents time and a vertical axis represents the voltage. A graph 32B in FIG. 3B indicates an example of the hysteresis output. A horizontal axis in the graph 32B represents time and a vertical axis represents the voltage.

At a timing t4 in FIG. 3B, the detected voltage V1 is equal to or greater than the reference value. In this case, the hysteresis section 11 outputs the H level signal indicating the half bridge as the hysteresis output.

At a timing t5, the detected voltage V1 is smaller than the reference value. In this case, the hysteresis section 11 outputs the L level signal indicating the full bridge as the hysteresis output.

At a timing t6, the detected voltage V1 is equal to or greater than the reference value. In this case, the hysteresis section 11 outputs the H level signal indicating the half bridge as the hysteresis output.

At a timing t7, the detected voltage V1 is smaller than the reference value. In this case, the hysteresis section 11 outputs the L level signal indicating the full bridge as the hysteresis output.

At a timing t8, the detected voltage V1 is equal to or greater than the reference value. In this case, the hysteresis section 11 outputs the H level signal indicating the half bridge as the hysteresis output.

The fifth switching element RL1 deteriorates because of frequently switching between the half bridge and the full bridge. Thus, in the configuration as shown in FIG. 3A in which the hysteresis is taken into consideration, the life of the fifth switching element RL1 can be extended compared with the example in FIG. 3B.

Figure 4:
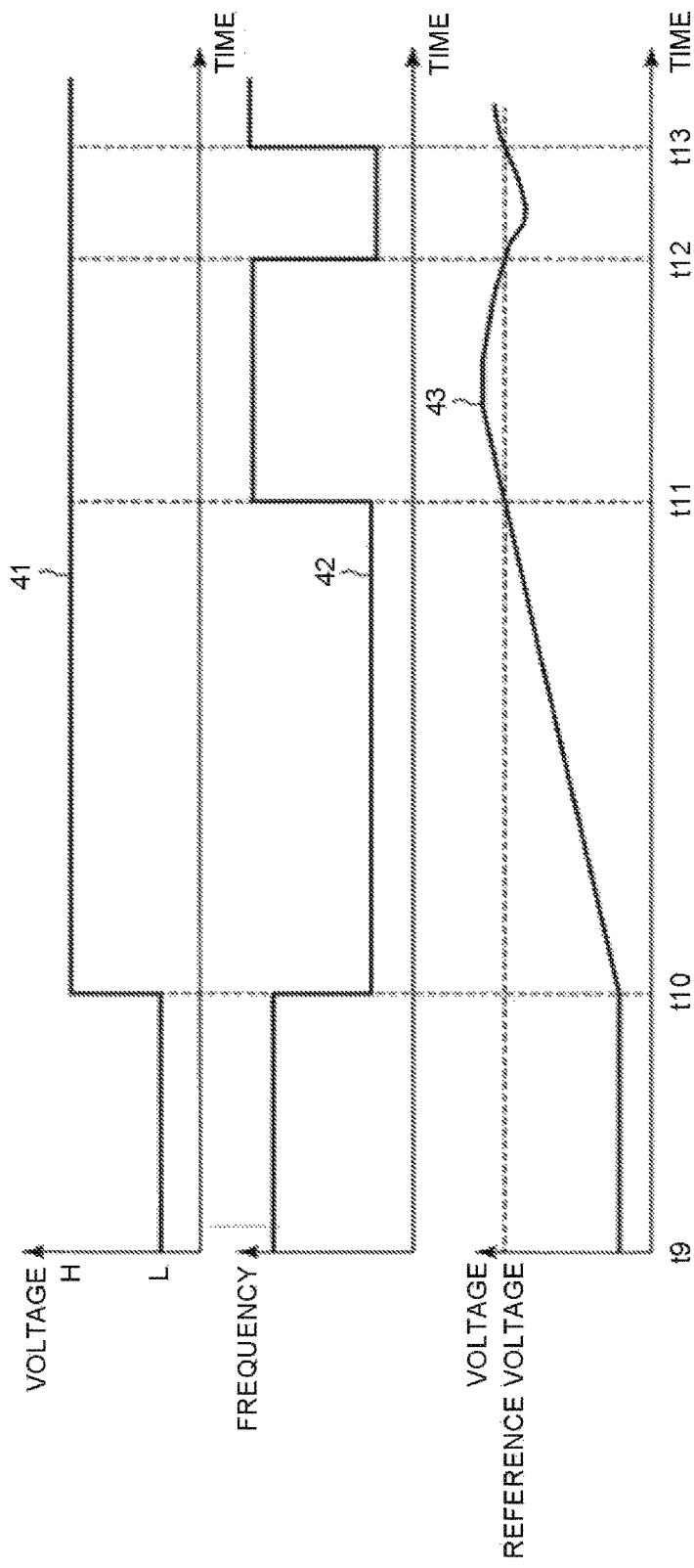
FIG. 4 is a diagram illustrating an example of the operation of the control circuit according to the first embodiment.

FIG. 4 is a diagram illustrating an example of the operations of the comparison section 15 and the frequency generator 17 of the control circuit 6. In a graph 41 in FIG. 4, the frequency designation signal Sig2 input from an external device is shown. A horizontal axis in the graph 41 represents time and a vertical axis represents the voltage. In a graph 42 in FIG. 4, the frequency generator output outputted from the frequency generator 17 is shown. A horizontal axis in the graph 42 represents time and a vertical axis represents the voltage. A graph 43 in FIG. 4 indicates the detected temperature V2 detected by the temperature detection section 5. A horizontal axis in the graph 43 represents time and a vertical axis represents the voltage.

At a timing t9, the detected temperature V2 is smaller than the reference voltage determined by the reference voltage determination section 16, and the frequency designation signal Sig2 is L level. In this case, the comparison section 15 outputs the comparison section output of L level. In a case in which the comparison section output is L level, in order to prioritize the frequency designation signal Sig2, the frequency generator 17 outputs the frequency (high frequency) corresponding to the frequency designation signal Sig2 of the L level as the frequency generator output.

At a timing t10, in a case in which the frequency designation signal Sig2 becomes the H level, the frequency generator 17 outputs the frequency (low frequency) corresponding to the frequency designation signal Sig2 of the H level as the frequency generator output. In this case, compared with a case in which the high frequency is output as the frequency generator output, the amount of heat generation in the induction heating load 7 increases.

At a timing t11, in a case in which the detected temperature V2 is equal to or greater than the reference voltage determined by the reference voltage determination section 16, the comparison section 15 outputs the comparison section output of the H level. In a case in which the comparison section output is the H level, the frequency generator 17 increases switching frequencies of the switching elements of the high frequency power conversion circuit 3 regardless of the frequency designation signal Sig2. In other words, the frequency generator 17 outputs a frequency higher than the frequency (low frequency) corresponding to the frequency designation signal Sig2 of the H level as the frequency generator output regardless of the frequency designation signal Sig2. In the example in FIG. 4, the frequency generator 17 outputs a frequency (high frequency) corresponding to the frequency designation signal Sig2 of the L level as the frequency generator output. In this case, compared with a case in which the low frequency is output as the frequency generator output, the amount of heat generation in the induction heating load 7 decreases.

At a timing t12, in a case in which the detected temperature V2 is smaller than the reference voltage determined by the reference voltage determination section 16, the comparison section 15 outputs the comparison section output of the L level. In a case in which the comparison section output is the L level, in order to prioritize the frequency designation signal Sig2, the frequency generator 17 outputs the frequency (low frequency) corresponding to the frequency designation signal Sig2 of the H level as the frequency generator output. In this case, compared with a case in which the high frequency is output as the frequency generator output, the amount of heat generation at the induction heating load 7 is increased.

At a timing t13, in a case in which the detected temperature V2 is equal to or greater than the reference voltage determined by the reference voltage determination section 16, the comparison section 15 outputs the comparison section output of the H level. In a case in which the comparison section output is H level, the frequency generator 17 increases the switching frequencies of the switching elements of the high frequency power conversion circuit 3 regardless of the frequency designation signal Sig2. In other words, the frequency generator 17 outputs a frequency higher than the frequency (low frequency) corresponding to the frequency designation signal Sig2 of the H level as the frequency generator output regardless of the frequency designation signal Sig2. In this case, compared with a case in which the low frequency is output as the frequency generator output, the amount of heat generation in the induction heating load 7 decreases.

The comparison section 15 and the frequency generator 17 operate as stated above, and thus the control circuit 6 can adjust the temperature of the induction heating load 7 to a temperature in response to the reference voltage determined by the reference voltage determination section 16.

Figure 5:
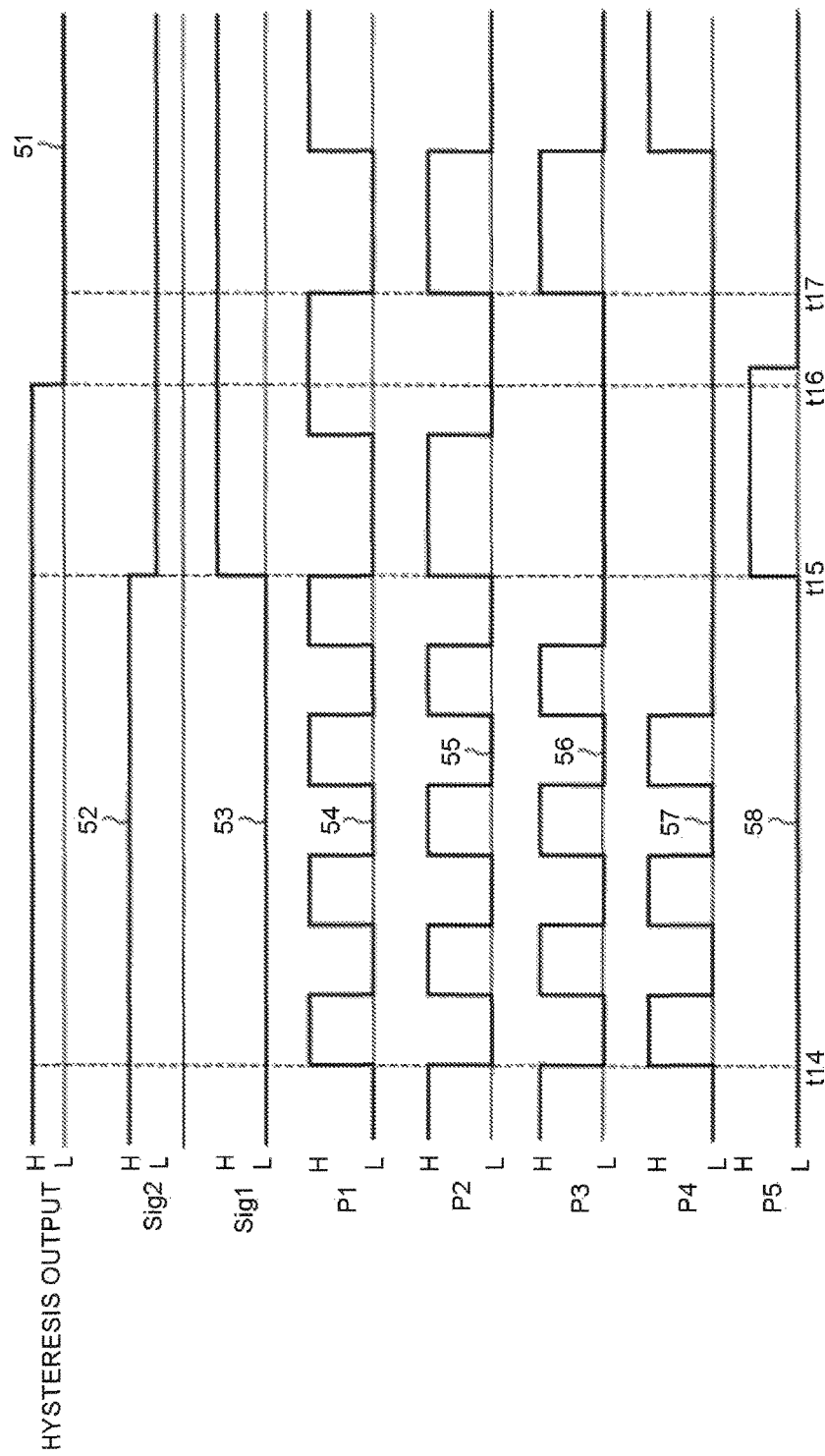
FIG. 5 is a diagram illustrating an example of the operation of the control circuit according to the first embodiment.

FIG. 5 is a timing chart illustrating an example of the operation of the pulse generator 18 of the control circuit 6. FIG. 5 shows an example in which the detected temperature V2 is smaller than the reference voltage. In the present example, the influence of the chattering is not considered.

A graph 51 in FIG. 5 indicates the hysteresis output outputted from the hysteresis section 11. A graph 52 in FIG. 5 indicates the frequency designation signal Sig2 input from an external device. A graph 53 in FIG. 5 indicates the operation mode command signal Sig1 input from an external device. A graph 54 in FIG. 5 indicates the control signal P1 input to the gate of the first switching element S1. A graph 55 in FIG. 5 indicates the control signal P2 input to the gate of the second switching element S2. A graph 56 in FIG. 5 indicates the control signal P3 input to the gate of the third switching element S3. A graph 57 in FIG. 5 indicates the control signal P4 input to the gate of the fourth switching element S4. A graph 58 in FIG. 5 indicates the control signal P5 input to the fifth switching element RL1.

According to the example in FIG. 5, in a period from a timing t14 to a timing t15, the hysteresis output is the H level, the operation mode command signal Sig1 is L level indicating the full bridge and the frequency designation signal Sig2 is H level indicating the high frequency. In this case, the mode determination section 14 supplies the mode output of the L level indicating the full bridge to the pulse generator 18. The pulse generator 18 enables the high frequency power conversion circuit 3 to operate as the full bridge inverter in a case in which the mode output of the L level is received. In other words, the pulse generator 18 inputs the control signal P5 of the L level to the fifth switching element RL1 to set the fifth switching element RL1 to the first connection state.

In a case in which the detected temperature V2 is smaller than the reference voltage, the comparison section 15 supplies the comparison section output of the L level to the frequency generator 17. The frequency generator 17 supplies the frequency generator output of the H level indicating the high frequency to the pulse generator 18 in a case in which the frequency designation signal Sig2 of the H level and the comparison section output of the L level are received. The pulse generator 18 generates the control signal P1, the control signal P2, the control signal P3 and the control signal P4 which are the pulse signals with the frequencies corresponding to the frequency generator output of the H level in a case in which the mode output of the L level and the frequency generator output of the H level are received. The phase of the control signal P2 is inverted to that of the control signal P1. The phase of the control signal P3 is inverted to that of the control signal P1 and synchronized with that of the control signal P2. The phase of the control signal P4 is synchronized with that of the control signal P1 and inverted to those of the control signal P2 and the control signal P3.

The pulse generator 18 respectively inputs the control signal P1, the control signal P2, the control signal P3 and the control signal P4 to the first switching element S1, the second switching element S2, the third switching element S3 and the fourth switching element S4. In this way, the pulse generator 18 alternately turns on the combination of the first switching element S1 and the fourth switching element S4 and the combination of the second switching element S2 and the third switching element S3 at the frequency corresponding to the frequency generator output of the H level to switch the direction of the current flowing through the induction coil L1.

At a timing t15, the operation mode command signal Sig1 becomes H level indicating the half bridge, and the frequency designation signal Sig2 becomes the L level designating the low frequency. In this case, the mode determination section 14 supplies the mode output of the H level indicating the half bridge to the pulse generator 18. The pulse generator 18 enables the high frequency power conversion circuit 3 to operate as the half bridge inverter in a case in which the mode output of the H level is received. In other words, the pulse generator 18 input the control signal P5 of the H level to the fifth switching element RL1 to set the fifth switching element RL1 to the second connection state.

In a case in which the detected temperature V2 is smaller than the reference voltage, the comparison section 15 supplies the comparison section output of the L level to the frequency generator 17. In a case in which the frequency designation signal Sig2 of the L level and the comparison section output of the L level are received, the frequency generator 17 supplies the frequency generator output of the L level indicating the low frequency to the pulse generator 18. In a case in which the mode output of the H level and the frequency generator output of the L level are received, the pulse generator 18 generates the control signal P1 and the control signal P2 which are the pulse signals with the frequencies corresponding to the frequency generator output of the L level. The control signal P2 is the pulse signal with the phase inverted to that of the control signal P1.

The pulse generator 18 inputs the control signal P1 to the first switching element S1, inputs the control signal P2 to the second switching element S2 and turns off the third switching element S3 and the fourth switching element S4. In this way, the pulse generator 18 alternately turns on the first switching element and the second switching element S2 at the frequency corresponding to the frequency generator output of the L level to switch the direction of the current flowing to the induction coil L1.

At a timing t16, the hysteresis output becomes L level. In this case, the mode determination section 14 supplies the mode output of the L level indicating the full bridge to the pulse generator 18. The pulse generator 18 enables the high frequency power conversion circuit 3 to operate as the full bridge inverter in a case in which the mode output of the L level is received. In other words, the pulse generator 18 inputs the control signal P5 of the L level to the fifth switching element RL1 to set the fifth switching element RL1 to the first connection state.

In a case in which the detected temperature V2 is smaller than the reference voltage, the comparison section 15 supplies the comparison section output of the L level to the frequency generator 17. In a case in which the frequency designation signal Sig2 of the L level and the comparison section output of the L level are received, the frequency generator 17 supplies the frequency generator output of the L level indicating the low frequency to the pulse generator 18. In a case in which the mode output of the L level and the frequency generator output of the L level are received, the pulse generator 18 generates the control signal P1 to the control signal P4 which are the pulse signals with the frequencies corresponding to the frequency generator output of the L level.

The pulse generator 18 inputs the control signal P1, the control signal P2, the control signal P3 and the control signal P4 to the first switching element S1, the second switching element S2, the third switching element S3 and the fourth switching element S4. In this way, the pulse generator 18 alternately turns on the combination of the first switching element S1 and the fourth switching element S4 and the combination of the second switching element S2 and the third switching element S3 at the frequency corresponding to the frequency generator output of the L level to switch the direction of the current flowing to the induction coil L1. Further, the pulse generator 18 switches to the operation in the full bridge at a timing t17 which is the timing at the end of the cycle at the time the mode output becomes L level.

With such a constitution, the power conversion circuit 1 can switch the operation mode to the full bridge flexibly without waiting for the control from the external device even if the input voltage rapidly drops unexpectedly. As a result, the power conversion circuit that operates stably can be provided.

Figure 6:
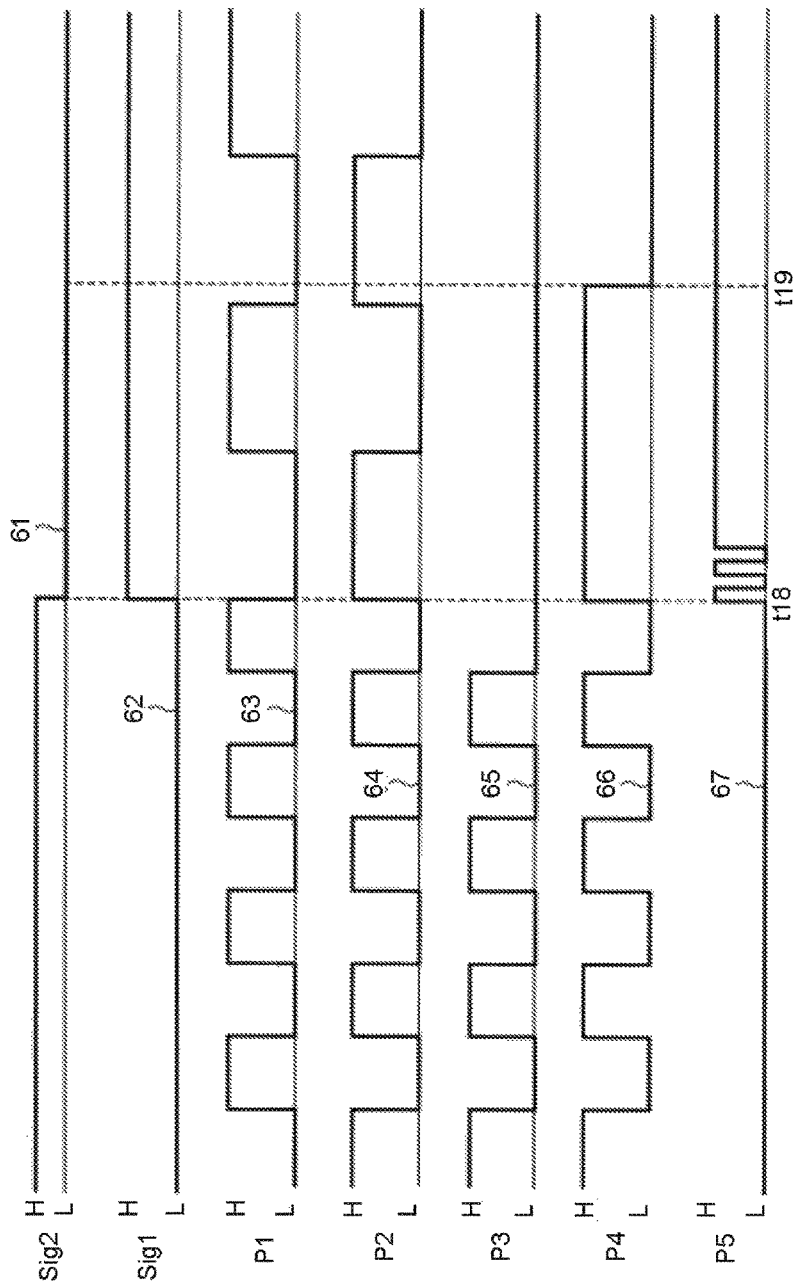
FIG. 6 is a diagram illustrating an example of the operation of the control circuit according to the first embodiment.

FIG. 6 is a timing chart illustrating other operations of the pulse generator 18 of the control circuit 6. FIG. 6 shows an example in which the detected temperature V2 is smaller than the reference voltage and the hysteresis output is always the H level.

A graph 61 in FIG. 6 indicates the frequency designation signal Sig2 input from an external device. A graph 62 in FIG. 6 indicates the operation mode command signal Sig1 input from an external device. A graph 63 in FIG. 6 indicates the control signal P1 input to the gate of the first switching element S1. A graph 64 in FIG. 6 indicates the control signal P2 input to the gate of the second switching element S2. A graph 65 in FIG. 6 indicates the control signal P3 input to the gate of the third switching element S3. A graph 66 in FIG. 6 indicates the control signal P4 input to the gate of the fourth switching element S4. A graph 67 in FIG. 6 indicates the control signal P5 input to the fifth switching element RL1.

According to an example in FIG. 6, until a timing t18, the pulse generator 18 receives the operation mode command signal Sig1 of the L level indicating the full bridge and the frequency designation signal Sig2 of the H level designating the high frequency. The pulse generator 18 receives the time constant TL from the chattering suppression section 19. In this case, the pulse generator 18 inputs the control signal P5 of the L level to the fifth switching element RL1, sets the fifth switching element RL1 to the first connection state, and respectively inputs the control signal P1 to the control signal P4 to the first switching element S1 to the fourth switching element S4. In this way, the pulse generator 18 enables the high frequency power conversion circuit 3 to operate as the full bridge inverter.

At the timing t18, the operation mode command signal Sig1 becomes the H level indicating the half bridge, and the frequency designation signal Sig2 becomes the L level for designating the low frequency. In this case, the pulse generator 18 inputs the control signal P5 of the H level to the fifth switching element RL1 to set the fifth switching element RL1 to the second connection state. Further, the pulse generator 18 generates the control signal P1 and the control signal P2 to respectively input them to the first switching element S1 and the second switching element S2. Thus, the pulse generator 18 enables the high frequency power conversion circuit 3 to operate as the half bridge inverter. Further, the pulse generator 18 generates the control signal P4 which is the H level in a period from the timing t18 to a timing t19 to input the control signal P4 to the fourth switching element S4. The pulse generator 18 determines an interval between the timing t18 and the timing t19 according to the time constant TL. The pulse generator 18 conducts the fourth switching element S4 for the time corresponding to the time constant TL in a case in which the high frequency power conversion circuit 3 switches the state from a state of operating as the full bridge inverter to a state of operating as the half bridge inverter. As a result, the pulse generator 18 can ensure the path of the current even if the chattering occurs.

As stated above, the power conversion circuit 1 includes the high frequency power conversion circuit 3 capable of switching the state between the state of operating as the full bridge inverter and the state of operating as the half bridge inverter by controlling the pulse signals input to the switching elements constituting the inverter and a signal input to the relay switch. The power conversion circuit 1 determines whether the high frequency power conversion circuit 3 operates as the full bridge inverter or as the half bridge inverter according to the detected voltage V1 of the input voltage. According to the constitution, the power conversion circuit 1 can transmit the proper electric power to the load even if an effective value of the input voltage of the AC power supply fluctuates.

The power conversion circuit 1 determines the lower limit value and the upper limit value of the detected voltage V1 in advance to determine whether the high frequency power conversion circuit 3 operates as the full bridge inverter or as the half bridge inverter according to the relationship between the detected voltage V1 and the lower limit value and the upper limit value. According to the constitution, the power conversion circuit 1 can prevent the operation state of the high frequency power conversion circuit 3 from being frequently switched by variation of the detected voltage V1.

The power conversion circuit 1 switches the operation state of the high frequency power conversion circuit 3 to the full bridge at the time the detected voltage V1 becomes smaller than the lower limit value from a state of being equal to or greater than the lower limit value and smaller than the upper limit value. In other words, the power conversion circuit 1 switches the operation state of the high frequency power conversion circuit 3 to the full bridge at the time the detected voltage V1 is smaller than the lower limit value. In this way, the power conversion circuit 1 can supply the sufficient electric power to the load by switching the operation state of the high frequency power conversion circuit 3 to the full bridge even if the detected voltage V1 is short.

The power conversion circuit 1 switches the operation state of the high frequency power conversion circuit 3 to the half bridge in a case in which the detected voltage V1 becomes equal to or greater than the upper limit value from a state of being equal to or greater than the lower limit value and smaller than the upper limit value and the signal instructing to switch the operation state to the half bridge is input from the external device. In a case in which the high frequency power conversion circuit 3 operates in the half bridge, the power conversion circuit 1 can switch the switching element at the lower frequency than that in a case of operating in the full bridge. The lower the switching frequency is, the easier the control becomes. The power conversion circuit 1 can easily control the switching elements of the high frequency power conversion circuit 3 by switching the operation state of the high frequency power conversion circuit 3 to the half bridge.

The power conversion circuit 1 further includes the temperature detection section 5 for detecting the temperature of the induction heating load 7 heated by the magnetic field generated in the induction coil L1 connected to the high frequency power conversion circuit 3. The power conversion circuit 1 carries out control in such a way as to increase the frequency at the time of switching the switching elements of the high frequency power conversion circuit 3 in a case in which the value of the detected temperature V2 which is the voltage corresponding to the temperature detected by the temperature detection section 5 is equal to greater than the preset reference voltage. Thus, the power conversion circuit 1 can decrease the electric power transmitted to the load by the high frequency power conversion circuit 3. As a result, the power conversion circuit 1 can transmit the proper electric power to the load.

The power conversion circuit 1 conducts the fourth switching element S4 in a predetermined period of time in a case in which the high frequency power conversion circuit 3 switches the state from the state of operating as the full bridge inverter to the state of operating as the half bridge inverter. The power conversion circuit 1 can ensure the path of the current even if the chattering occurs in the relay switch.

The power conversion circuit 1 may often conduct the fourth switching element S4 in a case in which the high frequency power conversion circuit 3 switches the state to the state of operating as the half bridge inverter. Even in such a constitution, the power conversion circuit 1 can ensure the path of the current even if the chattering occurs in the relay switch.

Second Embodiment

Hereinafter, a power conversion circuit 1A according to the second embodiment is described. Furthermore, the same reference numerals are donated to the same components as those in the first embodiment, and the detailed description thereof is omitted.

Figure 7:
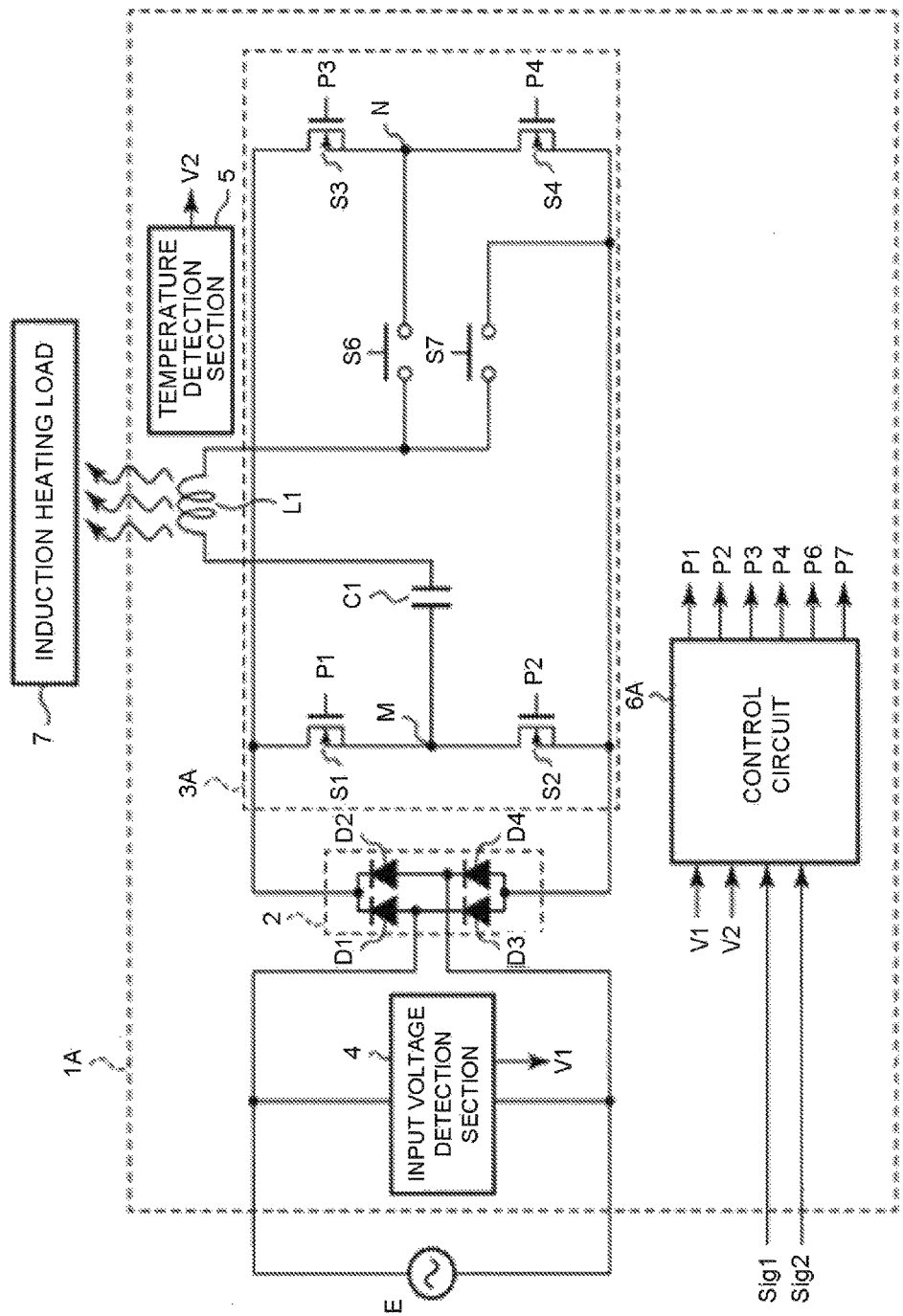
FIG. 7 is a diagram illustrating an example of the constitution of a power conversion circuit according to a second embodiment.

FIG. 7 is a diagram illustrating an example of the constitution of the power conversion circuit 1A according to the second embodiment. The power conversion circuit 1A includes the full-wave rectifying circuit 2, a high frequency power conversion circuit 3A and a control circuit 6A. The power conversion circuit 1A generates the high frequency current with the electric power supplied from the AC power supply E and applies the magnetic field generated by the high frequency current to the induction heating load 7 to heat the induction heating load 7.

The high frequency power conversion circuit 3A generates the alternating current with the high frequency from the pulsated positive voltage. The high frequency power conversion circuit 3A is provided with the first switching element S1, the second switching element S2, the third switching element S3, the fourth switching element S4, the capacitor C1, the induction coil L1, a sixth switching element RL2, and a seventh switching element RL3.

The sixth switching element RL2 and the seventh switching element RL3 are open-close relay switches that respectively switch a conduction state between a primary side and a secondary side. The sixth switching element RL2 and the seventh switching element RL3 switch the state thereof between a state (conduction state) in which the primary side and the secondary side are conducted and a state (disconnection state) in which the primary side and the secondary side are not conducted under the control of the control circuit 6A, respectively. The sixth switching element RL2 and the seventh switching element RL3 are controlled by the control circuit 6A so as not to be brought into conduction state and disconnection state at the same time. In other words, the sixth switching element RL2 and the seventh switching element RL3 are in a state in which the sixth switching element RL2 is conducted and the seventh switching element RL3 is disconnected, or vice versa.

The sixth switching element RL2 is connected between the induction coil L1 and the connection point N. The seventh switching element RL3 is connected between the induction coil L1 and the negative terminal of the full-wave rectifying circuit 2. The first connection state of the fifth switch RL1 in the first embodiment is synonymous with that the sixth switching element RL2 is conducted and the seventh switching element RL3 is disconnected. The second connection state of the fifth switch RL1 in the first embodiment is synonymous with that the sixth switching element RL2 is disconnected and the seventh switching element RL3 is conducted. In other words, in a case in which the sixth switching element RL2 is conducted and the seventh switching element RL3 is disconnected, the high frequency power conversion circuit 3A can operate as the full bridge inverter. The high frequency power conversion circuit 3A can operate as the half bridge inverter in a case in which the sixth switching element RL2 is disconnected and the seventh switching element RL3 is conducted.

The control circuit 6A controls the operation of each switching element of the power conversion circuit 1A. The signals input to the control circuit 6A include the detected voltage V1, the detected temperature V2, the operation mode command signal Sig1 and the frequency designation signal Sig2.

The control circuit 6A generates the control signal P1 to the control signal P4, a control signal P6 for controlling the sixth switching element RL2 and a control signal P7 for controlling the seventh switching element RL3 based on the above input signals. The control circuit 6A respectively inputs the control signal P6 of the H level and the control signal P7 of the L level to the sixth switching element RL2 and the seventh switching element RL3 in a case in which the high frequency power conversion circuit 3A operates as the full bridge inverter. The control circuit 6A conducts the sixth switching element RL2 and disconnects the seventh switching element RL3.

The control circuit 6A respectively inputs the control signal P6 of the L level and the control signal P7 of the H level to the sixth switching element RL2 and the seventh switching element RL3 in a case in which the high frequency power conversion circuit 3A operates as the full bridge inverter. The control circuit 6A disconnects the sixth switching element RL2 and conducts the seventh switching element RL3.

According to the above constitution, the power conversion circuit 1A can achieve the same effect as the power conversion circuit 1 of the first embodiment.

The example of the analog circuit and the example of the digital circuit of each constitution in the above are merely examples, and the constitution may be optional as long as the same operations can be carried out.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A power conversion circuit, comprising:
a rectifying circuit configured to rectify an AC power supply;
a first switching element connected to a positive terminal of an output terminal of the rectifying circuit;
a second switching element connected between the first switching element and a negative terminal of the output terminal of the rectifying circuit;
a third switching element connected to the positive terminal of the output terminal of the rectifying circuit;
a fourth switching element connected between the third switching element and the negative terminal of the output terminal of the rectifying circuit;
a series connection of a capacitor and an induction coil one side of which is connected to a first connection point between the first switching element and the second switching element;
a fifth switching element configured to switch a state between a first connection state in which the other side of the series connection of the capacitor and the induction coil is connected to a second connection point between the third switching element and the fourth switching element and a second connection state in which the other side of the series connection of the capacitor and the induction coil is connected to the output terminal of the rectifying circuit;

a voltage detection section configured to detect a voltage of the AC power supply; and a control circuit configured to switch the fifth switching element between the first connection state and the second connection state based on a detection voltage by the voltage detection section to input pulse signals to the first to the fourth switching elements.

2. The power conversion circuit according to claim 1, wherein the control circuit switches the fifth switching element between the first connection state and the second connection state according to a relationship between the detected voltage and a preset upper limit value and a preset lower limit value.

3. The power conversion circuit according to claim 2, wherein the control circuit switches the fifth switching element to the first connection state in a case in which the detected voltage becomes smaller than the lower limit value from a state of being equal to or greater than the preset lower limit value and smaller than the preset upper limit value.

4. The power conversion circuit according to claim 2, wherein the control circuit switches the fifth switching element to the second connection state in a case in which the detected voltage becomes greater than the upper limit value from a state of being equal to or greater than the preset lower limit value and smaller than the preset upper limit value and a signal for switching the fifth switching element to the second connection state is input.

5. The power conversion circuit according to claim 1, further comprising:

a temperature detection section configured to detect a temperature of an induction heating load heated by a magnetic field generated in the induction coil, wherein the control circuit increases frequencies of pulse signals input to the first to the fourth switching elements in a case in which a detected temperature by the temperature detection section is equal to or greater than a preset value.

6. The power conversion circuit according to claim 1, wherein the control circuit conducts the fourth switching element in a preset period of time in a case in which the fifth switching element switches from the first connection state to the second connection state.

7. The power conversion circuit according to claim 1, wherein the control circuit conducts the fourth switching element while the fifth switching element is in the second connection state.

8. A method of forming an image on a sheet in an image forming apparatus, comprising:

forming a toner image on a sheet;

heating a fixing roller with the power conversion circuit according to claim 1;

fixing the toner image on the sheet to form the image on the sheet.

9. An image forming apparatus, comprising:

an image forming section comprising a photoconductive drum and a fixing roller; and a power conversion circuit for heating the fixing roller, the power conversion circuit comprising:

a rectifying circuit configured to rectify an AC power supply;

a first switching element connected to a positive terminal of an output terminal of the rectifying circuit;

a second switching element connected between the first switching element and a negative terminal of the output terminal of the rectifying circuit;

a third switching element connected to the positive terminal of the output terminal of the rectifying circuit;

a fourth switching element connected between the third switching element and the negative terminal of the output terminal of the rectifying circuit;

a series connection of a capacitor and an induction coil one side of which is connected to a first connection point between the first switching element and the second switching element;

a fifth switching element configured to switch a state between a first connection state in which the other side of the series connection of the capacitor and the induction coil is connected to a second connection point between the third switching element and the fourth switching element and a second connection state in which the other side of the series connection of the capacitor and the induction coil is connected to the output terminal of the rectifying circuit;

a voltage detection section configured to detect a voltage of the AC power supply; and a control circuit configured to switch the fifth switching element between the first connection state and the second connection state based on a detection voltage by the voltage detection section to input pulse signals to the first to the fourth switching elements.

10. The image forming apparatus according to claim 9, wherein the control circuit switches the fifth switching element between the first connection state and the second connection state according to a relationship between the detected voltage and a preset upper limit value and a preset lower limit value.

11. The image forming apparatus according to claim 10, wherein the control circuit switches the fifth switching element to the first connection state in a case in which the detected voltage becomes smaller than the lower limit value from a state of being equal to or greater than the preset lower limit value and smaller than the preset upper limit value.

12. The image forming apparatus according to claim 10, wherein the control circuit switches the fifth switching element to the second connection state in a case in which the detected voltage becomes greater than the upper limit value from a state of being equal to or greater than the preset lower limit value and smaller than the preset upper limit value and a signal for switching the fifth switching element to the second connection state is input.

13. The image forming apparatus according to claim 9, further comprising:

a temperature detection section configured to detect a temperature of an induction heating load heated by a magnetic field generated in the induction coil, wherein the control circuit increases frequencies of pulse signals input to the first to the fourth switching elements in a case in which a detected temperature by the temperature detection section is equal to or greater than a preset value.

14. The image forming apparatus according to claim 9, wherein
the control circuit conducts the fourth switching element in a preset period of time in a case in which the fifth switching element switches from the first connection state to the second connection state.

15. A power conversion method in a circuit comprising a first switching element connected to a positive terminal of an output terminal of the rectifying circuit, a second switching element connected between the first switching element and a negative terminal of the output terminal of the rectifying circuit, a third switching element connected to the positive terminal of the output terminal of the rectifying circuit, a fourth switching element connected between the third switching element and the negative terminal of the output terminal of the rectifying circuit, and a series connection of a capacitor and an induction coil one side of which is connected to a first connection point between the first switching element and the second switching element, comprising:
rectifying an AC power supply;
switching a state of a fifth switching element between a first connection state in which the other side of the series connection of the capacitor and the induction coil is connected to a second connection point between the third switching element and the fourth switching element and a second connection state in which the other side of the series connection of the capacitor and the induction coil is connected to an output terminal of the rectifying circuit;
detecting a voltage of the AC power supply; and
switching the fifth switching element between the first connection state and the second connection state based on a detection voltage to input pulse signals to the first to the fourth switching elements.

16. The power conversion method according to claim 15, further comprising:
switching the fifth switching element between the first connection state and the second connection state according to a relationship between the detected voltage and a preset upper limit value and a preset lower limit value.

17. The power conversion method according to claim 16, further comprising:
switching the fifth switching element to the first connection state in a case in which the detected voltage becomes smaller than the lower limit value from a state of being equal to or greater than the preset lower limit value and smaller than the preset upper limit value.

18. The power conversion method according to claim 16, further comprising:
switching the fifth switching element to the second connection state in a case in which the detected voltage becomes greater than the upper limit value from a state of being equal to or greater than the preset lower limit value and smaller than the preset upper limit value and a signal for switching the fifth switching element to the second connection state is input.

19. The power conversion method according to claim 15, further comprising:
detecting a temperature of an induction heating load heated by a magnetic field generated in the induction coil; and
increasing frequencies of pulse signals input to the first to the fourth switching elements in a case in which a detected temperature is equal to or greater than a preset value.

20. The power conversion method according to claim 15, further comprising:
conducting the fourth switching element in a preset period of time in a case in which the fifth switching element switches from the first connection state to the second connection state.

* * * * *